United States Patent [19]
Hasslinger

[11] Patent Number: 5,826,792
[45] Date of Patent: Oct. 27, 1998

[54] AUTOMATIC CONTROL INCORPORATED WITHIN LAWN WATERING SYSTEMS

[76] Inventor: Lawrence J. Hasslinger, 1515 N. 105th St., Omaha, Nebr. 68114

[21] Appl. No.: 865,710

[22] Filed: May 30, 1997

Related U.S. Application Data

[63] Continuation of Ser. No. 341,647, Nov. 17, 1994, abandoned.

[51] Int. Cl.$^6$ ............................. A01G 25/16; B05B 12/10
[52] U.S. Cl. ............................... 239/69; 293/75; 137/78.2
[58] Field of Search .................................. 239/64, 67, 69, 239/75; 137/59–62, 78.2, 79

[56] References Cited

U.S. PATENT DOCUMENTS

| | | | |
|---|---|---|---|
| 3,224,676 | 12/1965 | Rauchwerger | 137/78.2 |
| 4,635,668 | 1/1987 | Netter | 137/62 |
| 4,730,637 | 3/1988 | White | 137/62 |
| 4,921,001 | 5/1990 | Pittsinger | 137/78.2 |
| 5,139,044 | 8/1992 | Otten et al. | 239/69 X |
| 5,148,826 | 9/1992 | Bakhshaei | 239/64 X |
| 5,154,349 | 10/1992 | Vaughn | 239/69 |
| 5,464,044 | 11/1995 | Brinkerhoff | 239/64 X |

FOREIGN PATENT DOCUMENTS

| 1137405 | 12/1968 | United Kingdom | 137/62 |
|---|---|---|---|

*Primary Examiner*—Lesley D. Morris
*Attorney, Agent, or Firm*—Zarley,McKee, Thomte, Voorhees & Sease

[57] ABSTRACT

An electrically operated water control valve is interposed in a sprinkler water line extending from a building structure and which is controlled by an air temperature sensor so that the water control valve will be turned off when the air temperature drops to a predetermined level and so that the water control valve will be turned on when the air temperature rises to a predetermined level.

7 Claims, 3 Drawing Sheets

AUTOMATIC CONTROL INCORPORATED WITHIN LAWN WATERING SYSTEMS

CROSS-REFERENCE TO RELATED APPLICATION

This is a continuation application of Ser. No. 08/341,647 filed Nov. 17, 1994 and now abandoned.

TECHNICAL FIELD

The sought automatic control means for preventing freezing water resultant damage to conventional lawn watering systems generally comprises: interposably adding the following automatic control strategically and functionally located interdependent structural elements: a no freeze control unit atmospherically governed by an atmospherically sensitive temperature sensing device tied there into and interveningly tied into the prior art watering system control box; and said no freeze control unit being also actuatably connected to a novel electrically actuatable valve intervening along a conventional interior water supply line for a prior art lawn watering system. There are also instructions for tying a said no freeze control unit, temperature sensitive unit, and a novel electrical valve intervening into a conventional water supply line for a conventional lawn watering system.

BACKGROUND OF THE INVENTION

Drawing FIG. 1 schematically depicts a typical watering system (9) for an outdoors lawn (L) located externally adjacent a household or commercial building structure (M) and which watering system (9) conventionally generally comprises:

(i) Located interiorly within a building structure (M): A water supply line (10) provided with an on/off valve (11), and an egress line emanating from building structure (M);

(ii) Located exteriorly of a structure (M) and communicating with such egress line (14), a backflow unit (15) which prevents water from being introduced from an outflow line (16) toward egress line (14). Immediately flanking backflow unit (15) are on/off valves (14a) and (16a) at egress line (14) and outflow line (16), respectively;

(iii) Preferably located exteriorly of a building structure (M) is a bank (20) of electrically actuatable sprinkler valves (e.g. 21–23). The said outflow line (16) communicates with each of said sprinkler valves. Extending respectively outwardly from such sprinkler valves (e.g. 21–23) are sprinkler lines (e.g. 24–26) which respectively communicate with spraying sprinkler heads (e.g. 27–29) that are strategically located along the lawn (L) to be watered. Interposed along outflow line (16), prior to its connections with such sprinkler valves, is an automatic valve-like drain device (16b). This drain device (16b) serves as a water discharge site when the watering system is shut off, and will automatically release water therefrom when the water pressure in supply line (10) becomes "low" (i.e. below about 2½ psi); and (iv) Preferably located interiorly of a building structure (M) is an electrical control box 30 equipped with a plurality of on/off switches (e.g. 31–33) respectively electrically connected (e.g. 34–38) to electrically actuatable sprinkler valves (e.g. 21, 22, 23).

Whenever the atmospheric temperature declines toward the 32° F. water freezing level, freezing water will resultingly damage (or possibly rupture) the atmospherically located outflow line area (16, 16a), the backflow unit (15), and/or the egress line (14, 14a). Such resultant damage from freezing water is costly in necessitating: replacement of watering system damaged parts; and/or repair to the lawn terrain (L) or adjacent building structure (M) occasioned by water escaping from freezingly ruptured watering system parts. Heretofore, custodians of prior art watering systems (9) have had to rely upon manual control means for prevention of freezing water damage, namely: the watering system custodian (especially during autumn and spring time) must vigilantly survey the atmospheric temperature, and whenever the custodian notes that the atmospheric temperature declines toward 32° F. he/she must immediately manually: shut off the water supply line valve (11) and open the drainage line valve (13) of byline (12) and then actuate at least one control box switch (e.g. 31, 32, 33). Such prior art manual control means for preventing freezing water damage to lawn watering systems (e.g. 9) is deficient in that the watering system custodian is "held hostage" to autumn and spring time weather exigencies wherein atmospheric temperatures unpredictably periodically intersect the 32° F. critical temperature.

SUMMARY OF THE INVENTION

It is a general objective of the invention to provide automatic control means, counterdistinguised from prior art manual control means, for preventing freezing water damage to atmospherically located portions of conventional lawn watering systems and to the lawn terrain and adjacent building structures, but which automatic control means is hospitable toward the watering systems' capability for automatic functionability through the incoming water supply line whenever ambient weather upwardly fluctuates to a level above the critical 32° F. level.

BRIEF DESCRIPTION OF THE DRAWINGS

In the drawing, wherein like characters refer to like parts in the several views, and in which:

Drawing FIG. 1, aforedescribed, structurally schematically depicts a typical prior art lawn watering system (9) and which environment is vulnerable to resultant damage from freezing water;

Figure 1:
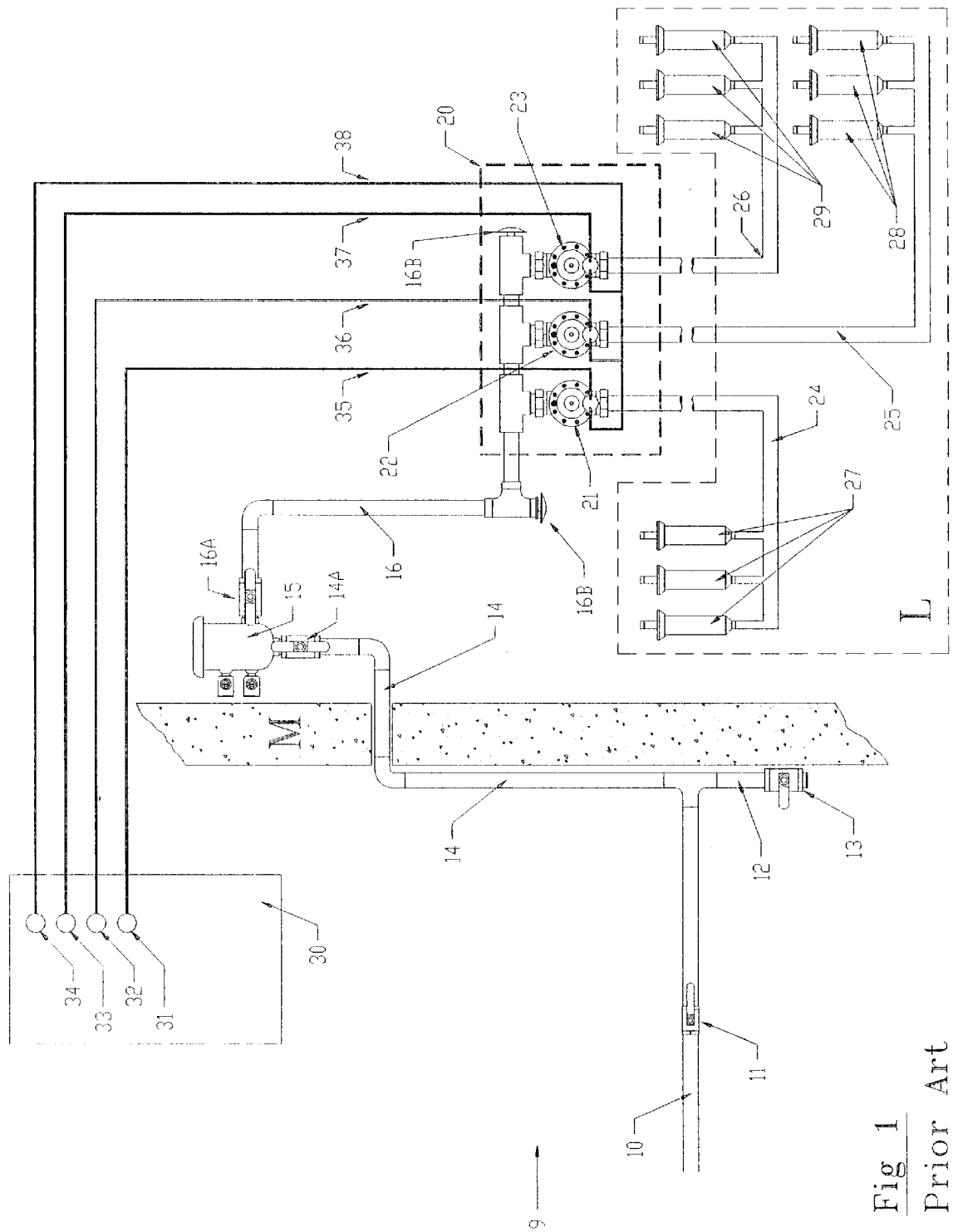
Figure 2:
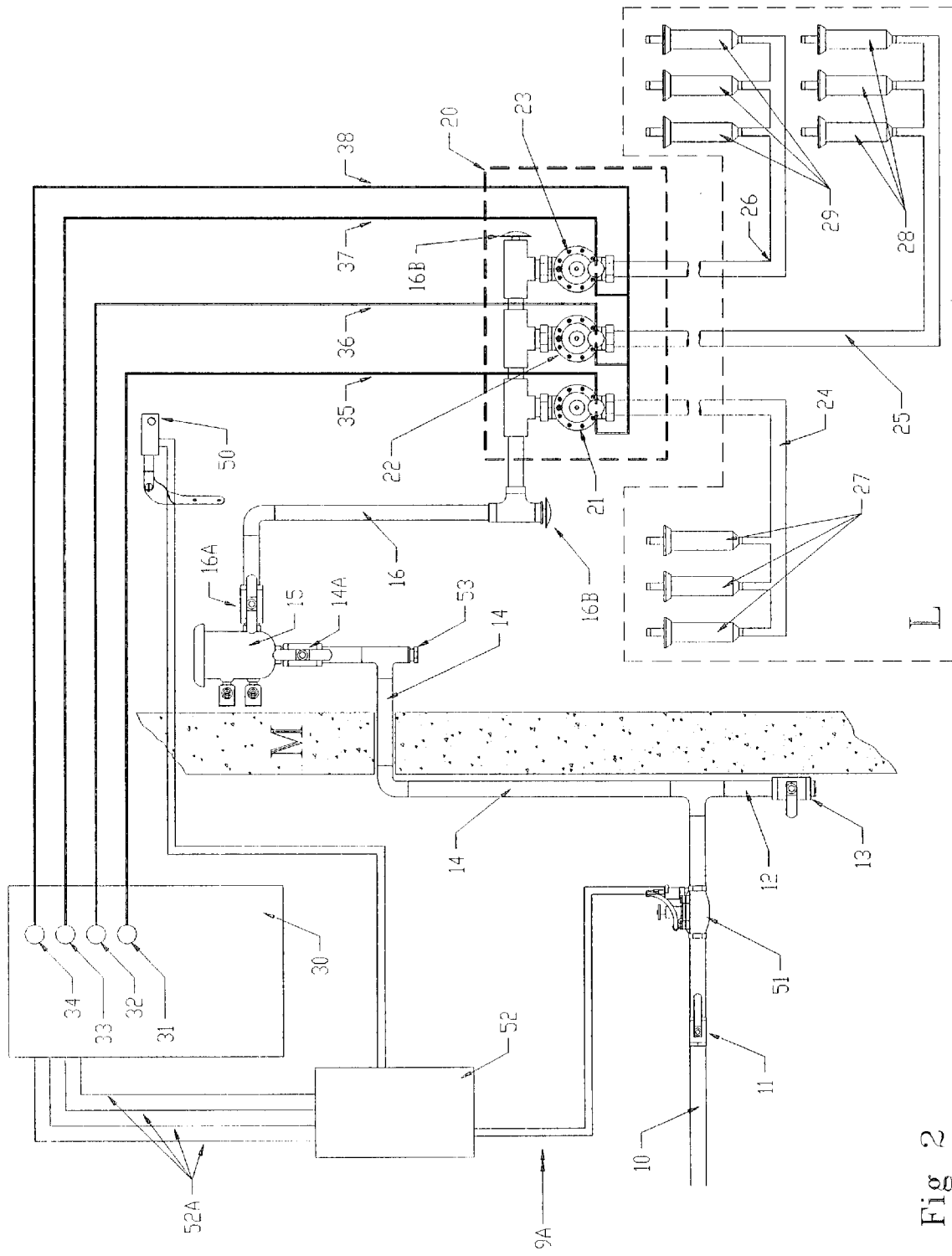
Figure 3:
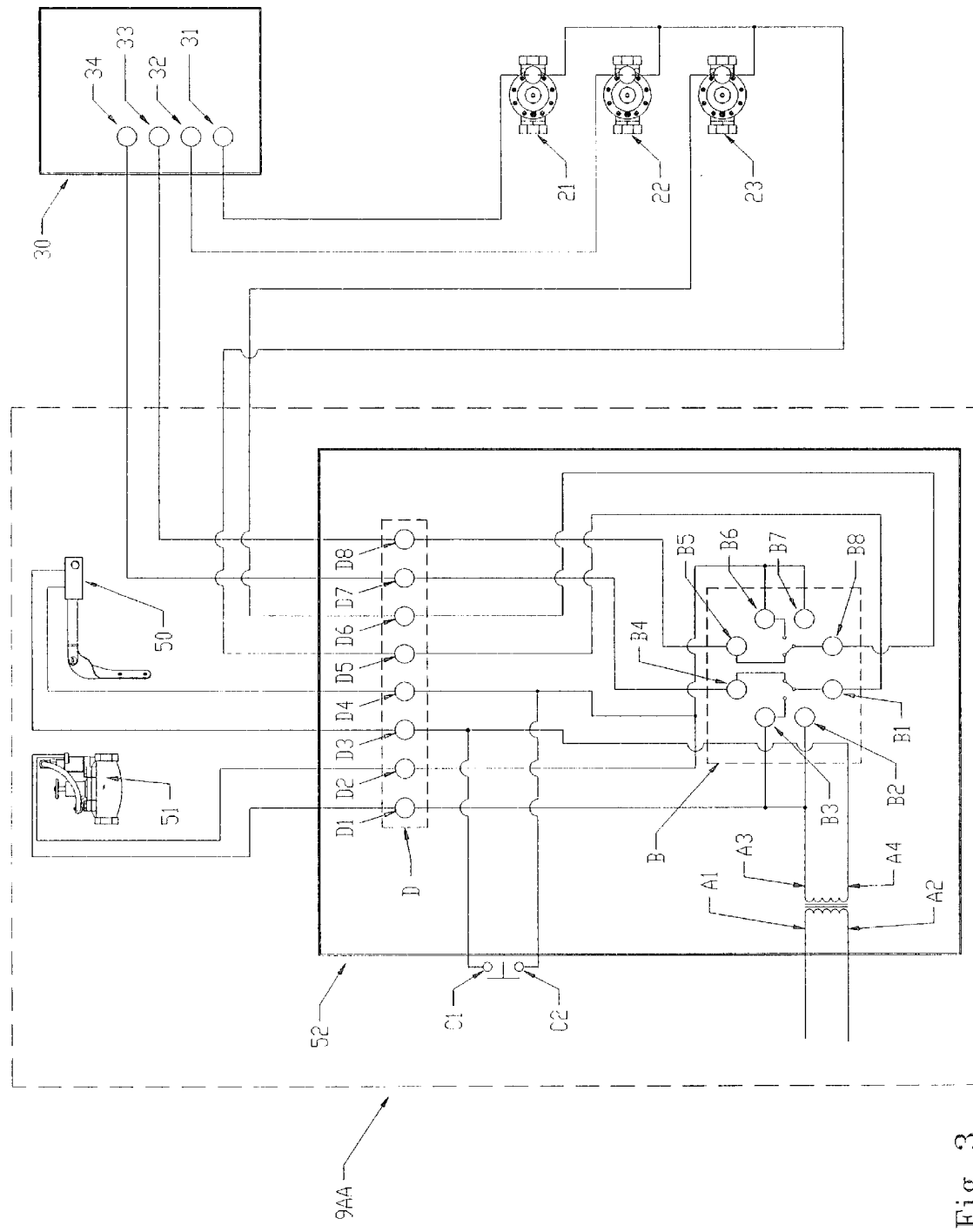

Drawing FIG. 2 incorporates the structural features of the typical prior art lawn watering system (9) of FIG. 1, but which is augmentably re-identified (e.g. as representative embodiment 9A) for an automatic control (e.g. 50, 51, 52) for preventing freezing water resultant damage to lawn watering systems; and Drawing FIG. 3 details the "automatic control" features (e.g. 50, 51, 52) for the novel and structurally augmented re-identified "automatic control" concept (9A) of the present invention.

DETAILED DESCRIPTION OF THE PREFERRED EMBODIMENT

Turning initially and most importantly to drawing FIG. 2, it will be seen that the representative embodiment (9A) of the automatic control for preventing freezing water resultant damage to lawn watering systems comprises augmentably modifying a prior art watering system (9) by incorporating therewithin: a control unit (52) electrically atmospherically governed by an outdoors stationed temperature sensitive sensor (50) and which novel control unit (52) is also electrically connected (52A) to appropriate respective switches (e.g. 31–33) of an existing control box (30); and said novel control unit (52) being also electrically actuatably connected to a novel electrically actuatable valve (51) interposed along a conventional indoors water supply line (10); and accordingly, whenever the outdoors atmospheric temperature is sensed (50) to be falling toward the 32° F. critical water freezing level, the control unit (52) will command the novel electrically actuatable valve 51 (interposed along a conventional indoors water supply line (10)) to shut off incoming water and turn on selected sprinkler valves (e.g. 21,22, 23).

Though the recitations contained in the immediately preceding paragraph are verily believed to adequately describe novel and patentable subject matter without further descriptive commentary thereon, the following description of drawing FIG. 3 now ensues to amplify the novel combination (9M) of control unit (52) and its ancillary components (50, 51), which are respectively appropriately electrically tied into the control box (30) and the sprinkler valves (e.g. 21–23) of an existing conventional lawn watering system (e.g. 9 of FIG. 1).

Control unit (52), which is electrically tied into said ancillary outdoors temperature sensing unit (50) and indoors water supply line electrically actuatable valve, therein includes:

(A) a 115 VAC step down transformer (A1, A2, A3, A4);
(B) a double pole, double throw 24 VAC relay having several electrical contacts (B1–B8);
(C) a double pole single throw switch (C1, C2); and
(D) a terminal block strip D having several electrical contacts (D1–D8).

Emanating from terminal block D electrical leads (D1–D8) for a novel combination (9AA) of electrically interconnected elements (50, 51, 52) are the following:

(a) from D1, to one terminal of valve (51) and also to A3, B2, and B3;
(b) from D2, to a second terminal of valve (51) and also to B6, and B7;
(c) from D3, to one terminal of outdoors temperatures sensing unit (50) and to C1 and A4;
(d) from D4, to a second terminal of said outdoors temperature sensitive unit (50) and to C2, B6, and B7;
(e) from D5, to B1, and serially therefrom sprinkler valves (e.g. 21–23);
(f) from D6, to B8 and to a sprinkler valve (e.g. 23);
(g) from D7, to B4 and to control box (30) contact (34); and
(h) from D8, to B5 and to control box (30) contact (33), In addition, there are electrical leads proceeding from:

(I) from one side of a sprinkler valve (22) to a control box (30) contact (32); and
(j) from one side of a sprinkler valve (21) to a control box (30) contact (31).

Numeral 53 in drawing FIG. 2 refers to another apparently novel feature i.e. an all brass automatic drain (53) in the egress line (14). Specifically, this drain (53) will serve as a safety device when water in the egress side (14) of the backflow unit (15) begins to freeze and is pushed up against a float component contained within the backflow unit. When such freezing water movement occurs, air is introduced into the egress line (14) through the backflow unit, and the freezing water will then be appropriately discharged through such appropriately inserted automatic drain (53).

In view of the foregoing, the construction and operation of the automatic control incorporation means for preventing freezing water damage to a lawn watering system will be readily understood and further explanation is believed to be unnecessary. However since numerous modifications and changes will readily occur to those skilled dint he art, it is not desired to limit the invention to the exact construction shown and described, and accordingly, all suitable modifications and equivalents may be resorted to, falling within the scope of the herein appended claims.

I claim:

1. In combination:

a building structure having a water supply line therein;

a sprinkler water line operatively fluidly connected to said water supply line and extending outwardly from said building structure;

at least one water sprinkler connected to said sprinkler water line;

at least one electrically operated sprinkler control valve interposed in said sprinkler water outside of said building structure for controlling the flow of water to said water sprinkler;

an electrically operated sprinkler control assembly operatively connected to said sprinkler control valve for controlling the operation of said sprinkler control valve;

an electrically controlled first water control valve interposed in said water supply line in said building structure for controlling the flow of water form said water supply line to said sprinkler water line;

an electrically operated control assembly electrically connected to said first water control valve for controlling the operation of said first water control valve;

an air temperature sensing unit positioned outwardly of said building structure electrically connected to said control assembly and being adapted to turn off said first water control valve, through said control assembly, when the air temperature outwardly of said building structure drops to a predetermined temperature and adapted to turn on said water control valve, through said control assembly, when the air temperature outwardly of said building structure rises to a predetermined temperature subsequent to said water control valve having been turned off by a drop in the air temperature;

a backflow assembly interposed in said sprinkler water line outwardly of said building structure, between said first water control valve and said sprinkler control valve; and a pressure operated drain valve interposed in said sprinkler water line, outwardly of the building structure, between the first water control valve and the backflow assembly.

2. The combination of claim 1, wherein said control assembly is electrically connected to said sprinkler control assembly and to said sprinkler control valve; and wherein said control assembly further comprises:

(a) means for electrically disconnecting the sprinkler control assembly from the sprinkler control valve when the air temperature sensing unit turns off the first water control valve, and for electrically reconnecting the sprinkler control assembly to the sprinkler control valve when the air temperature sensing unit turns on the water control valve; and (b) means for operating the sprinkler control valve to an open position permitting water flow simultaneously with the turning off of the water control valve.

3. The combination of claim 2, further comprising a second pressure operated drain valve interposed in said sprinkler water line between the backflow assembly and the sprinkler control valve.

4. The combination of claim 3, wherein said pressure operated drain valves are responsive to a pressure drop in the sprinkler water line at the respective drain valves.

5. The combination of claim 4, wherein said backflow assembly includes means for introducing air into the sprinkler water line upon the occurrence of water freezing in sprinkler water line in an input side of the backflow assembly.

6. The combination of claim 1, wherein said pressure operated drain valve is responsive to a pressure drop in the sprinkler water line at the drain valve.

7. The combination of claim 1, wherein said backflow assembly includes means for introducing air into the sprinkler water line upon the occurrence of water freezing in sprinkler water line in an input side of the backflow assembly.

* * * * *